United States Patent Office 2,782,732
Patented Feb. 26, 1957

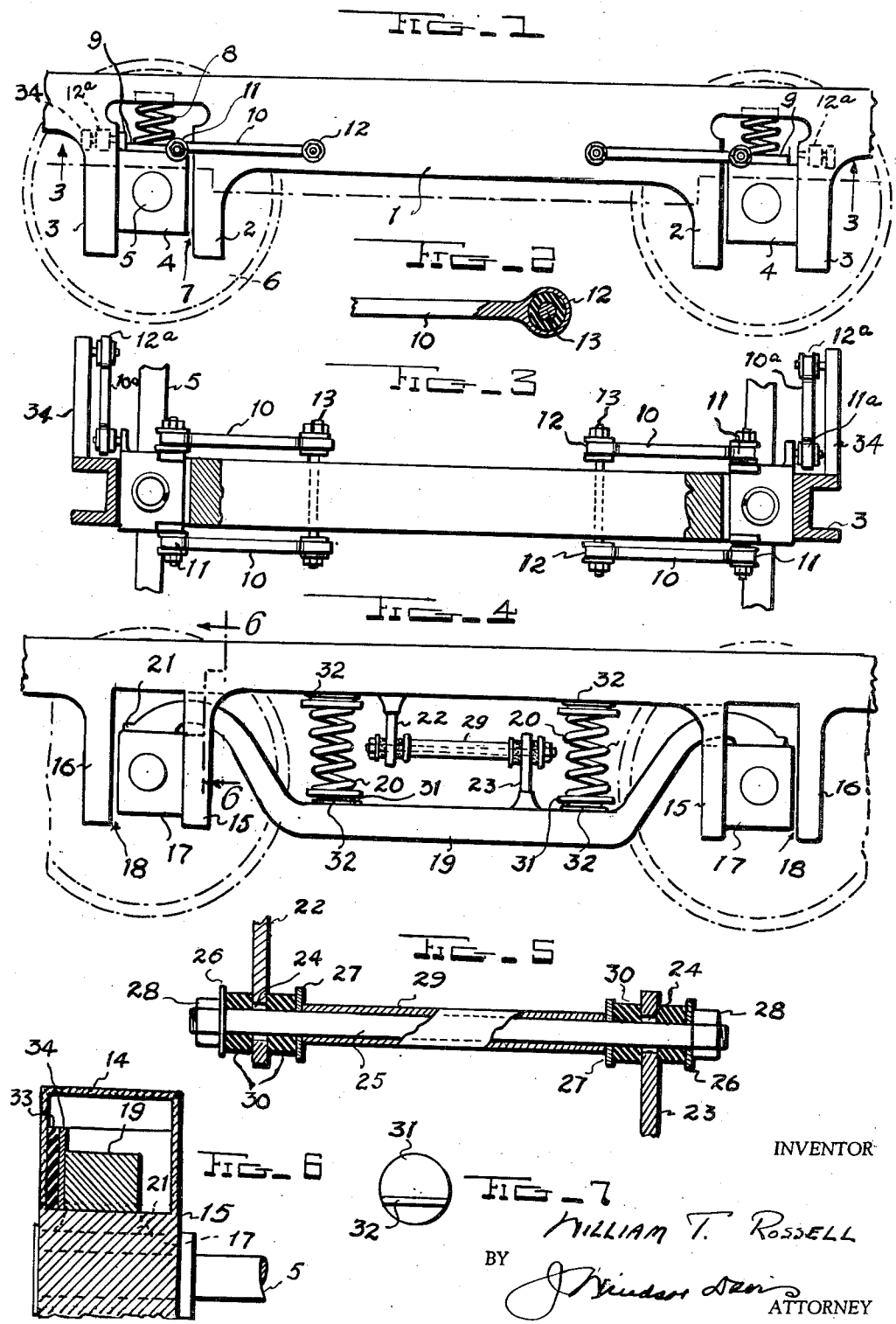

2,782,732
ANTI-HUNTING MEANS FOR RAIL TRUCKS

William T. Rossell, New York, N. Y., assignor to Transit Research Corporation, New York, N. Y., a corporation of New York Application December 8, 1952, Serial No. 324,623

5 Claims. (Cl. 105—225)

This invention relates to rail vehicles and has for its object to provide a truck construction including means for precluding or for breaking up the harmonic axle motions which cause hunting.

In conventional trucks wherein axle journal bearings reside between pedestal guides, the guides permit relative fore and aft movement and relative lateral movements of the journals with respect to the truck frame. The amount of this movement is generally of the order of one-sixteenth of an inch when the parts are new. As wear occurs this clearance increases. Assuming the wheels at the ends of the axles to be the same diameter at the thread surfaces, hunting is caused by the axles assuming an out-of-parallel relation with the tracks. The wheel flanges have a fillet in merging with the tread surface and as the wheel rides up on this fillet the wheel and axle are given a new direction. The new direction may be parallel to the tracks but, more often, is not, so the wheels trace a sine wave in a harmonic motion.

The object of this invention is to provide friction means for opposing movements of the journal boxes with respect to the truck frame. More particularly it is the object to provide friction plates between the journal springs and the journal boxes, the friction plates being capable of vertical movements with the journal boxes but restrained against fore and aft movements with respect to the truck frame, thus requiring the journal boxes to move against a heavy friction for all of their fore and aft movements relative to the truck frame.

Another object is to teach the application of my invention to trucks of the type employing equalizer bars by employing the tops of said equalizer bars as friction plates and by restraining and controlling the movements of the equalizer bars with respect to the main truck frame.

Other objects and advantages will become hereinafter more fully apparent as reference is had to the accompanying drawings in which Figure 1 is a side elevation of a truck frame showing the journal bearing assemblies controlled and arranged according to my invention, Figure 2 is a detail enlargened vertical section through an end of the friction plate link of Figure 1, Figure 3 is a horizontal view of one side of the truck taken along the line 3—3 of Figure 1, the ends of the truck being shown in section immediately above the journal bearings, Figure 4 is a side elevation of an equalized truck equipped with my invention, Figure 5 is an enlargened detail of the connecting arm of Figure 4, shown in section.

Figure 6 is a vertical section taken along the line 6—6 of Figure 4, and

Figure 7 is a plan view of a spring cap of Figure 4.

More particularly, 1 indicates a truck frame which may be that of any conventional truck employing pedestal guides 2 and 3 to limit the relative longitudinal and lateral movements of the journal boxes 4 with respect to the main frame 1. Axles 5 equipped with wheels 6 are journalled in bearings enclosed by the journal boxes 4. The usual clearance 7 longitudinally between the journal boxes 4 and one pedestal guide 2 is indicated in exaggerated manner.

Customarily, the journal springs 8 support the frame 1 directly from the journal boxes 4, the bottom of each of these springs deflecting laterally with respect to the top thereof with movements of the journal box. I provide a friction plate 9 between each journal spring 8 and each journal box, these plates each having sliding contact with the top of their respective journal boxes. In order to permit these plates 9 to move vertically with the journal boxes but to prohibit their longitudinal or lateral movement with respect to pedestal guides 2 and 3, I provide links 10 pivotally connected at one end 11 to the plates 9 and pivotally attached to the frame 1 at their other end 12.

While either or both ends of the link 10 may pivot on a plain pin 13, I prefer to employ a rubber sleeve between each pin and the link, as shown in Figure 2, as lubrication will not then be needed.

As best seen in Figure 3, the front links 10 seen in Figure 1 are duplicated on the back side or inside of the frame 1. This prevents rotation of the friction plates with respect to the top of the journal boxes. While the arrangement illustrated to this point will offer resistance to lateral movement of the plates 9 under movements of the journal boxes laterally of the frame 1, I also provide additional linkages 10a for this purpose, where needed. The links 10a are pivotally connected at one end 11a to the plate 9, as described in connection with the pivot ends 11, and at their other end 12a to a similar mounting carried by a bracket 34 fixedly attached to the pedestal leg 3 and extending transversely of the frame 14.

In operation, the journal boxes 4 may move longitudinally and laterally of the frame as permitted by the spacing of the pedestal guides 2 and 3 and the size of the journal boxes, but any such movement occurs against the friction between the journal boxes 4 and the friction plates 9. And it is highly important to note that when any such movement occurs, there is no restoring force tending to return the journal box to any starting position.

Figure 4 shows a frame 14 having integral pedestal guides 15 and 16. Journal boxes 17 reside between each pair of pedestal guides and have a slight clearance 18 with respect thereto. An equalizer bar 19 extends from the top of each journal to the top of the other journal box on the same side of the frame 14 and supports this frame by means of the springs 20. The construction to this point is conventional except that the ends 21 of the equalizer bars 19 are flat on the bottom and capable of sliding contact with respect to the top of their journal boxes.

In order to restrain the motions of the equalizer bars 19 longitudinally with respect to the frame 14, I provide one bracket 22 which depends from the frame 14 and a second bracket 23 which arises from the equalizer bar 19. These brackets each have an opening 24 therethrough, the brackets being of such length that the openings are in substantial alignment to receive a bar or shaft 25 therethrough. On each side of each bracket 22 and 23 I provide a rubber ring 30 and outwardly of each ring a metallic washer 26 and 27. A nut 28 is threaded on the end of the bar 25 and a metallic tube 29 acts as a spacer between the two washers 27. Tightening of the nut 28 thus imposes pressure on the rubber elements 30 against the metallic washers and against their respective brackets 22 or 23.

The springs 20 are equipped top and bottom with spring caps 31, each having a rocker or knife edge 32 on the surface thereof outwardly of the springs 20. The knife edges are offset from the center of the spring caps, as illustrated in Figure 7, thus causing the springs to tilt transversely of the truck frame. This tilting action causes the equalizer 19 to press against a wall of each pedestal guide 15 and to locate the equalizer bar with exactness laterally of the truck. Thus, if the journal boxes 17 move laterally of the truck they must overcome the friction between the ends of the equalizer bars and themselves. In order to damp the high frequency vibrations which would otherwise be transmitted from the equalizer bars to the frame 14, I provide a rubber pad 33 to separate the wall of the pedestal 15 from the wear plate 34 which contacts the equalizer bar.

In both forms of the invention, as explained, it will be noted that the friction plate 9 in Figures 1 and 3 and the end 21 of the equalizer bar 19 of Figures 4 and 6 are out of contact with the pedestal guides longitudinally, thus eliminating the transmission of high frequency vibrations from the friction plate to the truck frames. The construction of the linkage 10a, 11a, 12a and 34 may be duplicated similarly in Figures 4 and 6 to protect the transmission of high frequency vibrations from the equalizer bar to the frame 14. If the rubber pad 33 is sufficiently thick the same results will be approached.

Various modifications may be made without departing from the spirit of my invention and I therefore desire to be extended protection as defined by the scope of the appended claims.

What I claim is:

1. In a rail truck, a truck frame having pedestal assemblies at the corners thereof each of said assemblies comprising pedestal guides, a journal box between said guides, spring means supporting a corner of said frame from said journal box, a member having a friction surface on its lower side interposed between said journal box and its spring means, said journal box being slidable with respect to its said member and its friction surface to the extent permitted by said pedestal guides, and a link holding said member against substantial horizontal movement with respect to said frame, said link being connected to said frame and to said member through rubber cushioning elements.

2. In a rail truck, a truck frame having pedestal assemblies at the corners thereof each of said assemblies comprising pedestal guides, a journal box between said guides, spring means supporting a corner of said frame from said journal box, a friction plate interposed between said journal box and said spring means, said journal box being slidable with respect to said friction plate to the extent permitted by said pedestal guides, and a link connected at each end respectively to said frame and said plate through a pivot positioned to allow movements of said link through a vertical arc, said pivots each including a rubber cushioning element, said links and said pivots maintaining said friction plates at all times out of contact with said pedestal guides in a longitudinal truck direction.

3. In a rail truck, a truck frame having pedestal assemblies at the corners thereof each of said assemblies comprising pedestal guides, a journal box between said guides, spring means supporting a corner of said frame from said journal box, a friction plate interposed between said journal box and said spring means, said journal box being slidable with respect to said friction plate to the extent permitted by said pedestal guides, and a link connected at each end respectively to said frame and said plate through a pivot positioned to allow movements of said link through the vertical arc, said pivots each including a rubber cushioning element, said links and said pivots maintaining said friction plates at all times out of contact with said pedestal guides in a longitudinal truck direction, and means maintaining said friction plates against lateral movements with respect to said frame during relative movements of said journal box with respect thereto.

4. In a rail truck, a truck frame having pedestal assemblies at the corners thereof each of said assemblies comprising pedestal guides, a journal box between said guides, spring means supporting a corner of said frame from said journal boxes, a friction plate interposed between said spring means and said journal box, said journal box being slidable with respect to said friction plate to the extent permitted by said guides, and means positioning said friction plate for vertical movement with said journal box while holding said plate out of contact at all times with said pedestal guides, said means holding said friction plate substantially against horizontal movements with respect to said frame, said means comprising links connected at each end through rubber cushioned pivots to said friction plate and said frame respectively.

5. In a rail truck, a truck frame having pedestal assemblies at the corners thereof each of said assemblies comprising pedestal guides, a journal box between said guides, spring means supporting a corner of said frame from said journal box, a friction plate interposed between said spring means and said journal box, said journal box being slidable with respect to said friction plate to the extent permitted by said guides, and means positioning said friction plates for vertical movements with said journal box while holding said friction plates against all horizontal movements with respect to said frame, said means comprising a link connected at its ends through rubber cushions to said friction plate and to said frame and residing longitudinally of said frame together with a rubber cushion between said frame and said friction plate opposing contact of said friction plate and said frame in response to lateral movements of said journal box.

References Cited in the file of this patent

UNITED STATES PATENTS

| | | |
|---|---|---|
| 1,146,493 | Gilman | July 13, 1915 |
| 2,558,709 | Miller | June 26, 1951 |